May 29, 1956  A. B. PEFFER  2,747,539
PAN GREASING APPARATUS
Filed Dec. 23, 1952  3 Sheets-Sheet 1
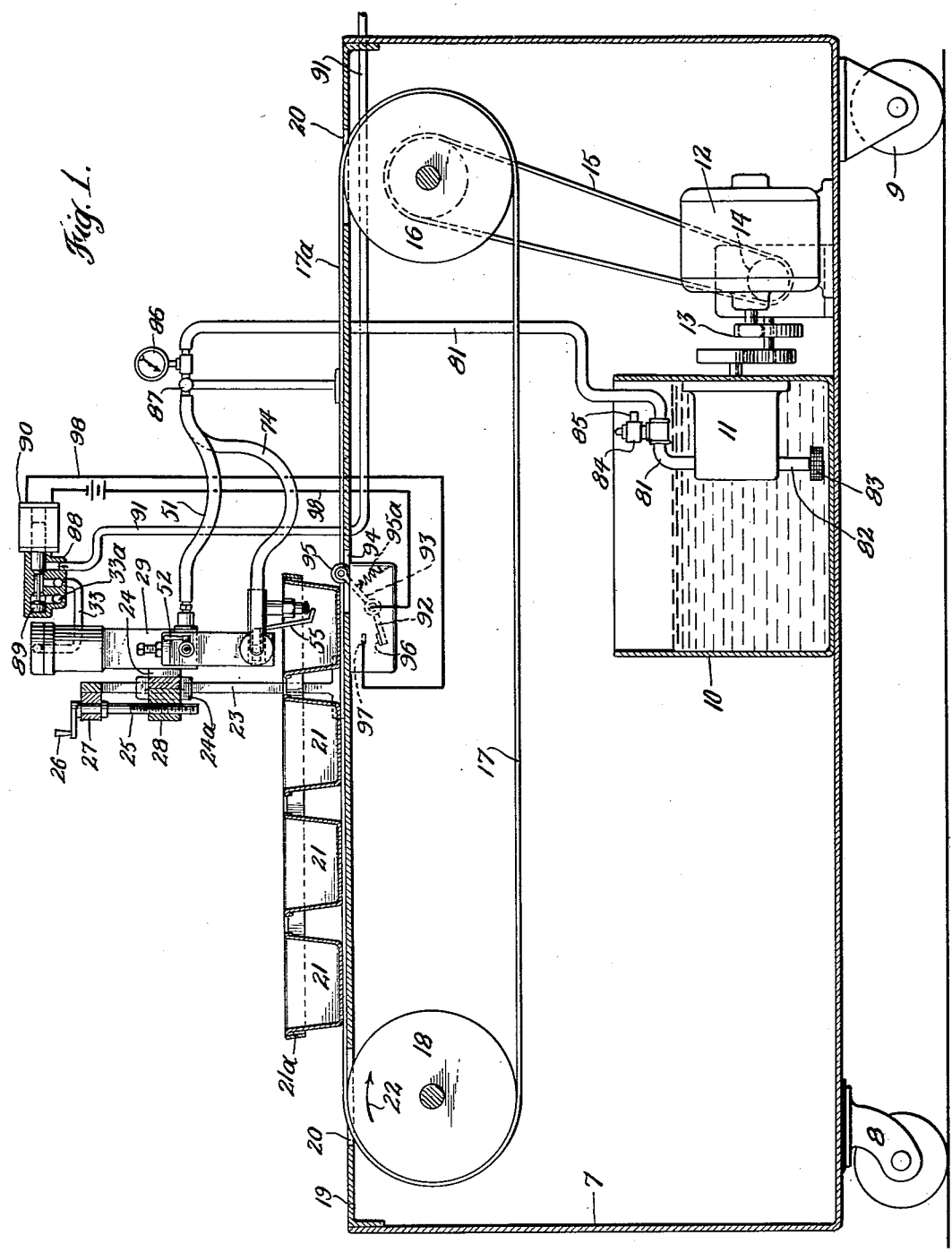
INVENTOR
Alrid B. Peffer
by Synnestvedt & Lechner
ATTORNEYS

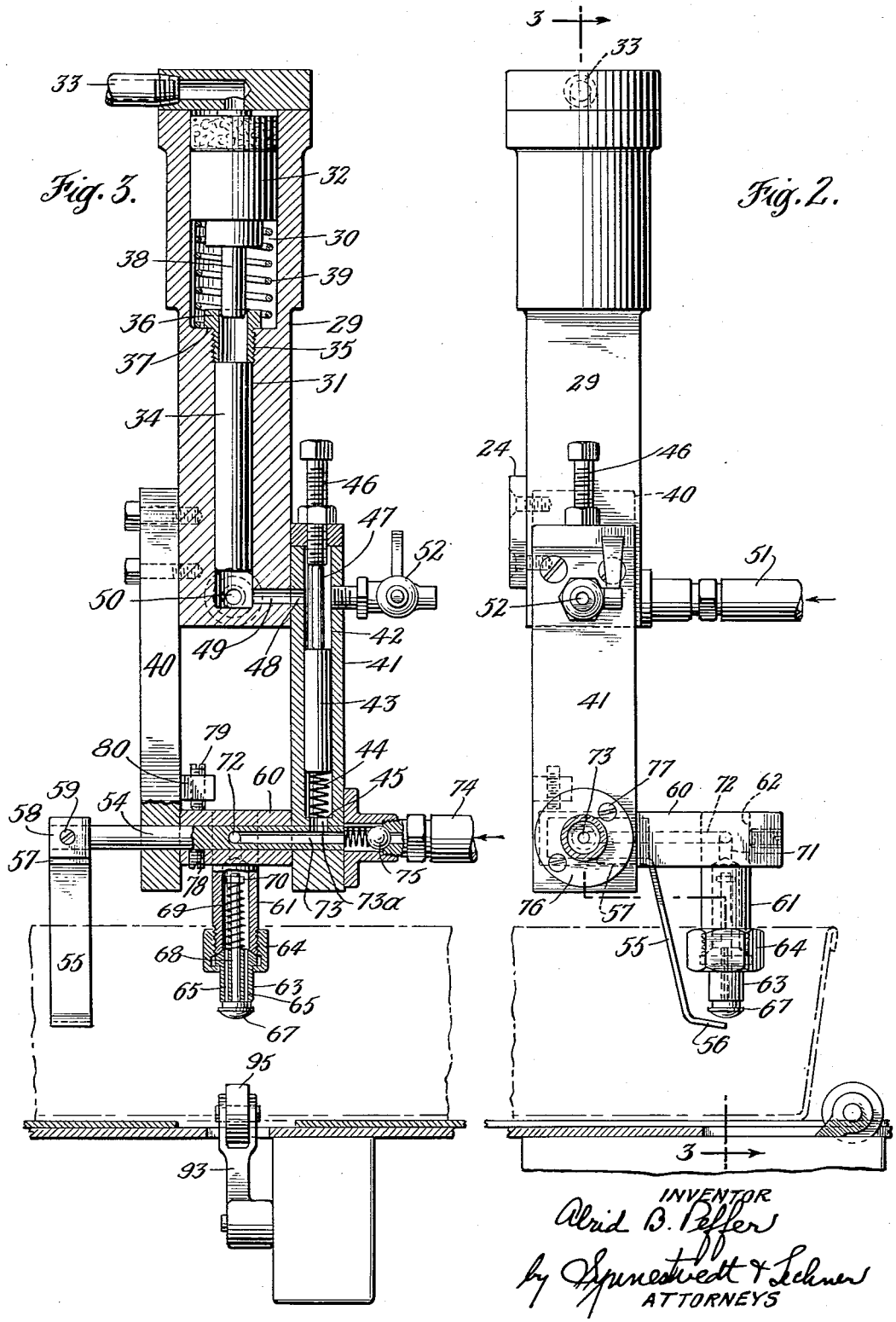

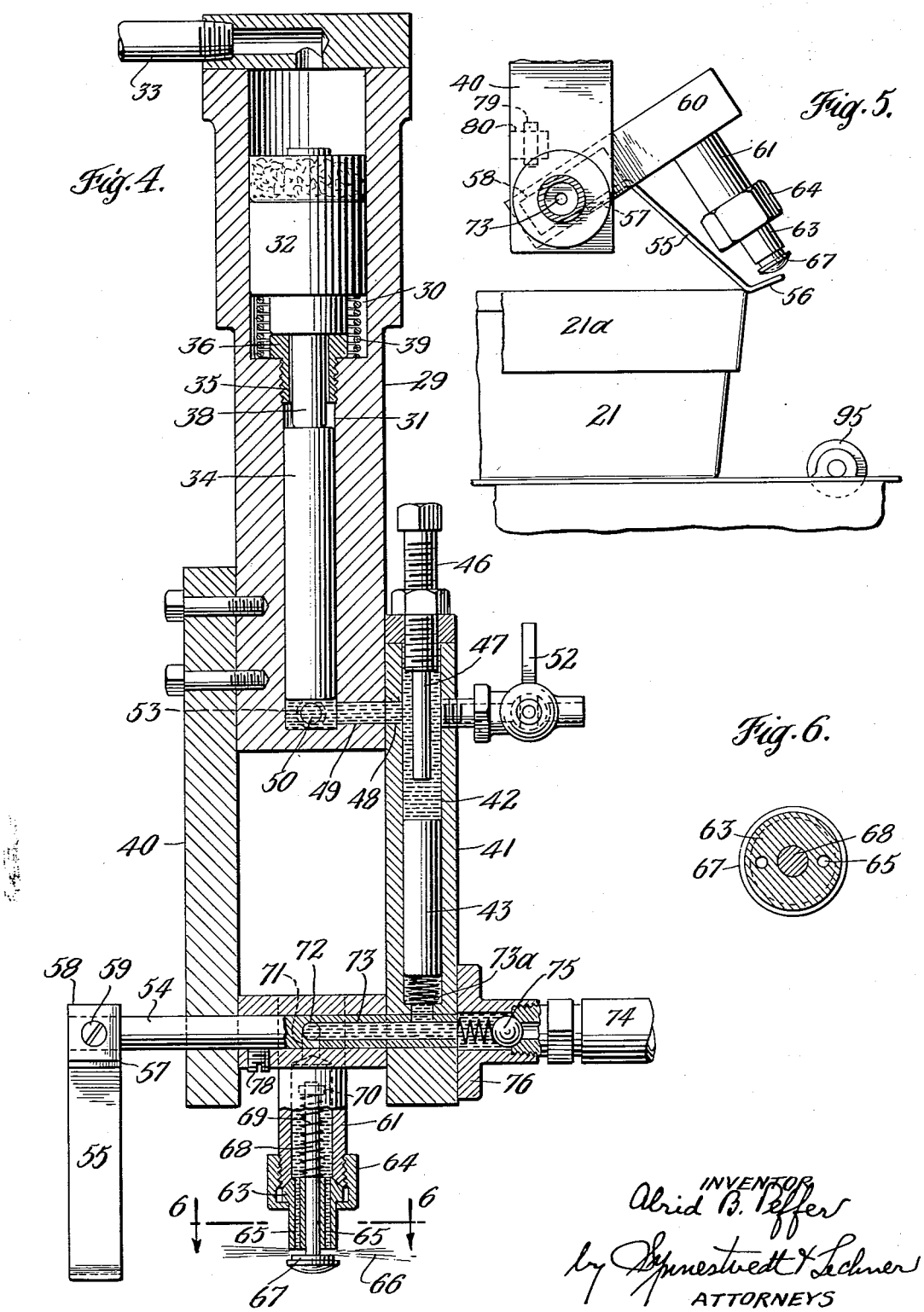

United States Patent Office 2,747,539
Patented May 29, 1956

2,747,539
PAN GREASING APPARATUS

Alrid B. Peffer, Philadelphia, Pa.

Application December 23, 1952, Serial No. 327,483

9 Claims. (Cl. 118—2)

This invention relates to apparatus for greasing pans such as are used by large commercial bakeries in the baking of bread, cake and the like.

Among the objects of the invention are the provision of an apparatus for more rapidly accomplishing the greasing operation as well as for increasing the thoroughness with which the grease is applied to the pans. I also aim to reduce grease consumption by eliminating wasteful grease application. A still further object is to provide a greatly simplified pan greasing mechanism which will operate without failure at high speeds for long periods of time as well as one which will reduce the frequency of servicing shut-downs and minimize maintenance costs.

Another object is to provide a mechanism which will spray the grease into the pans with great suddenness and power so as to increase the efficiency of the greasing operation and reduce the number of machines that are required for a given bakery capacity.

How the foregoing objects, together with such other objects as may appear hereinafter or are incident to my invention, are attained is illustrated in a preferred form in the accompanying drawings wherein Figure 1 is a vertical longitudinal section through a pan greasing machine embodying my improvements:

Figure 2 is an enlarged side elevation of a principal portion of my improved apparatus with certain parts in cross-section for the sake of greater clearness in illustration:

Figure 3 is a section on the line 3—3 of Figure 2:

Figure 4 is a section similar to that of Figure 3, but on a still more enlarged scale and illustrating the positions of various of the parts of the mechanism at the time that the grease is discharged into a pan:

Figure 5 is a side elevation similar to that of Figure 2, but illustrating only the lower portion of Figure 2 with the grease delivery nozzle just about on the point of entering a pan: and Figure 6 is an enlarged section taken as indicated by the line 6—6 in Figure 4.

My improved apparatus includes a cabinet member 7, mounted for convenient movement upon casters 8, and wheels 9. Within the cabinet is a grease reservoir 10, in which is placed the grease pump 11, driven by a motor 12, through suitable gearing 13. There is also a right angle drive from the motor 12 to a pulley 14 which operates a belt 15, adapted to drive the roller 16 of an endless belt conveyor 17. At the other end of the machine the conveyor passes around a second roller 18, all as clearly shown in Figure 1.

The top 19 of the cabinet is provided with suitable openings 20 in line with the conveyor rollers 16 and 17. so that the upper flight or run 17a of the conveyor will pass to the outside of and lie along the upper surface of the top 19.

The pans 21 are secured together in groups by a strap 21a—four pans being shown in Figure 1. The conveyor is driven in the direction of the arrow 22 and the pans are placed upon the upper flight of the conveyor at the left hand side of the machine and are moved by the conveyor toward the right, past the greasing mechanism proper to be described below.

Near the middle of the top of the cabinet I provide a pair of oppositely disposed vertical frame members 23, one at each side of the machine between which is extended a horizontal cross bar 24. At each end of the cross bar 24 is provided a suitable shoe 24a by means of which the bar can slide up and down on the members 23 under the influence of the adjusting screw 25, which latter is actuated by a crank 26. At its upper end the screw 25 is carried in a fixed position by the cross member 27 which, in turn, is secured to the uprights 23. The screw portion passes through a member 28, which is carried by the cross bar 24.

The greasing mechanism proper is also carried by the cross bar 24. It includes a motor device with a cylinder 29 having an upper large bore 30 and a lower small bore 31. In the upper bore is a reciprocating actuating member or piston 32, to the upper face of which compressed air can be supplied through the pipe 33. In the lower small bore 31 is located a piston 34 which, in its upper position, is adapted to seat against the underside of the seat member 35. The seat member is screw threaded into the upper portion of the small bore 31 and is provided with a shoulder 36 which rests upon the shoulder 37, formed between the large bore 30 and the small bore 31. There is a passage in the center of the seat member through which the piston rod 38 projects in line with the piston 34 which it is adapted to strike as will further appear. A compression spring 39 is provided for returning the air piston to its upper position, in which position it leaves a gap between the end of the striking portion 38 of the actuating piston 32 and the adjacent end of the grease piston 34 as shown in Fig. 3.

A downwardly extending bracket member 40 is secured to one side of the lower end of the cylinder 29 and at the opposite side is fastened a member 41 which also serves as a supporting bracket for certain parts to be described below. Within the member 41 is a cylindrical bore 42, in which reciprocates a piston 43 and it will be noted that the bore 42 and the piston 43 are of less diameter than the bore 31 and the piston 34, for purposes which will presently appear. The piston 43 is biased in an upward direction by a compression spring 44, seated against its underside and against a shoulder 45 near the bottom. The upper position of the piston 43 in its bore or cylinder 42 can be determined by the adjusting screw 46 at the top, the screw 46 having an extension 47 of reduced diameter as clearly shown in Figures 3 and 4. A passage 48 through the wall of the member 41 communicates with a passage 49 in the cylinder 29 and the latter in turn communicates with the bore 31 at a point beneath the lower position of the piston member 34. A lubricant supply passage 50 coming in at right angles to the passage 49 also communicates with the bore 31 at a point below the lower position of the piston 34. The passage 50 is connected to the flexible grease supply conduit 51. A normally closed cock 52 communicates with the interior of the cylinder bore 42 at a point opposite the passage 48. A ball check valve 53 prevents back flow of grease through the inlet or grease supply passage 50 when the grease piston 34 moves downwardly under the influence of the air pressure actuated piston 32 with its striking portion or piston rod extension 38.

Pivotally mounted between the lower portions of the bracket members 40 and 41, is a nozzle supporting shaft 54 which extends outwardly at one side, as shown in Figures 3 and 4, for the attachment of an operating foot 55. This foot has a lower angular extension 56, which is adapted to contact the edge of a pan 21 and an upper angular extension 57, which latter is secured in any suitable manner to the underside of a block member 58 adapted to be fastened to the end of the shaft 54 by the set screw 59. The block 58 is suitably reamed out to receive the end of the shaft 54. The position of the foot 55 circumferentially on the shaft 54 can, of course, be adjusted by releasing the set screw 59.

Mounted on the shaft 54 between the lower ends of the bracket members 40 and 41 is a nozzle supporting arm 60, which projects outwardly as best shown in Figures 2 and 5, and on the outer end of which is mounted the nozzle housing member 61, there being a pressure fitted connection between 60 and 61, as shown in dotted lines at 62 in Figure 2.

The lower end of the nozzle member 61 is threaded to carry the nozzle tip 63 which is held in place by means of the flanged nut 64, as shown to best advantage in Figure 4. Two or more grease passageways 65 carry the grease from the interior of the nozzle structure to the point where it is discharged laterally into the pans, as indicated by the dot and dash spray lines 66 in Figure 4.

Normally, the nozzle is closed by the valve member 67 which has an inner valve rod 68 working in a suitable bore in the nozzle tip 63. A compression spring 69 reacting between the tip 63 and an abutment 70 on the upper end of the rod 68, serves to maintain the valve in its closed position until the pressure of the grease entering the nozzle 61 is sufficient to overcome the pressure of the spring whereupon the valve 67 will be forced open and the grease will be sprayed outwardly into the pan as indicated.

Grease is supplied to the nozzle by means of the grease passages 71, 72 and 73, the passage 71 being a vertically extending passage which connects the interior of the nozzle body 61 with the longitudinal passage 72 in the arm 60. The passage 73 is a longitudinal passage in the shaft 54, to which grease is delivered through the flexible grease supply conduit 74 under the control of a ball check valve 75 which prevents back flow, as most clearly seen in Figure 4. The check valve is mounted in a suitable housing 76 secured by screws 77 against the outer face of the bracket member 41.

The arm 60 with the depending nozzle structure 61 swings with the shaft 54, the arm 60 being secured to the shaft by means of a set screw 78 and, by inspection of Figure 5, it will be seen that upward motion in a counterclockwise direction is effected when the edge of the pan 21 contacts the foot member 55. The nozzle is held in its upper position by the extension 56 as long as the extension rests upon the upper edge of the pan. As soon as the pan advances (to the right in Figure 5) gravity will immediately swing the nozzle structure downwardly so that the nozzle projects into the pan, as shown in Figures 1, 2 and 3. Movement in this gravity actuated direction is controlled by means of the stop screw 79 which is adjustably mounted in the lug 80 projecting from the inner side of the bracket member 40, as shown in Figures 3 and 5.

Grease is supplied to the flexible conduits 51 and 74 through the delivery line 81 coming from the pump 11. The pump is constantly running and draws grease from the reservoir 10 through the suction line 82 which is fitted with an inlet strainer 83. A pressure control valve 84 is connected to the pump discharge line 81 and after the desired pressure is built up in the line 81, excess grease is discharged from the outlet 85 back into the reservoir 10. A pressure gauge 86 is provided for the guidance of the operator in adjusting the pressure control valve so as to maintain any desired pressure. Connection, of course, between the pump discharge line 81 and the grease supply lines 51 and 74 is provided for by means of a suitable manifold at the point 87.

The air piston 32 in the large bore 30 is moved downwardly under the control of the piston valve device 88, the piston 89 of which can be moved by the solenoid 90 to a position where the compressed air coming in through the supply pipe 91 will pass through to the pipe 33 and so to the upper face of the piston 32 within the bore 30 as previously stated.

Actuation of the solenoid 90 is accomplished through the medium of a tripping mechanism which includes a toggle lever 92—93, the arm 93 projecting upwardly through an opening 94 in the table top 19 and carrying at its end a suitable roller 95 adapted to contact the bottoms of the pans. The arm 92 carries an electrical contact 96 adapted to cooperate with another contact 97 for the purpose of completing the circuit 98 which supplies current to the solenoid 90. In other words, when the advancing bottom edge of a pan contacts the roller 95, the toggle 92, 93 will be actuated to close the contacts 96—97 and the electrical circuit so completed will then operate the solenoid to move the piston 89 thereof to a position where the air pressure can be delivered to the face of the piston 32, whereupon the piston 32 will move downwardly to close the gap between itself and its effective actuating position. This is accomplished with great suddenness so that the piston rod 38 will strike a hammer-like blow on the upper end of the piston member 34 and force it downwardly against the grease trapped in the passages 50, 49, and 48, and in the upper portion of the bore 42 above the face of the piston member 43. As this occurs the check valve 53 will prevent back-flow through the supply conduit 51. Under the influence of this impact the grease in the bore 42 will suddenly and forcefully move the piston 43 downwardly and it will be obvious that the piston 43 will act with great power because of the fact that it is of lesser diameter than the piston 34. The spring below the piston 43 will then be compressed and the grease in the supply passages 73, 72 and 71 will be forced downwardly into the nozzle structure 61 and out through the delivery channels 65 in the manner already described, whereupon the nozzle valve 67 will be opened and the grease will be sprayed into the pan as indicated at 66. In this connection it should be noted that the lower portion of the bore 42 beneath the piston 43 is in communication with the grease passage 73 through an opening 73a, as clearly shown in Figures 3 and 4.

When the pan clears the roller 95, a suitable spring 95a returns the arm 93 to its upper position and breaks contact at 96—97, whereupon the piston 89 will move to the position indicated in Figure 1, so that the air pressure in the bore 30 above the piston 32 can be relieved through the pipe 33 and the outlet 33a.

It should be noted that the pans extend laterally sufficiently far beyond the width of the conveyor belt 17a to provide for contact with the roller 95 of the trigger mechanism as described.

The volume of grease delivered from the nozzle is, of course, dependent upon the length of the stroke of the piston member 43 and this can be adjusted by means of the adjusting screw 46—47.

I should also like to call attention to the fact that the provision of the two grease pistons 34 and 43 yields an important advantage in that the grease pressure which it is necessary to employ can be considerably less than it would be in the case of a single grease piston. It is, of course, quite possible to use a single grease piston but in this event I have found that it is necessary to carry a much higher pressure in the grease line.

With the equipment illustrated, I employ a grease pressure in the delivery line of approximately 10 pounds but at the moment of impact and discharge of the grease into the pans the pressure in the bore beneath the piston 43 may go up to as much as 200 pounds. These figures, of course, may vary somewhat and can be adjusted to whatever figures are preferred. Naturally, the high pressure built up at the moment of discharging the grease serves to very thoroughly and effectively cover the interior of the pans so that the greasing operation is very efficiently performed. In addition, there is very little unnecessary delivery of grease so that wastage is eliminated and economy of grease consumption promoted. This is due not only to the pressure involved but also, to a large extent, to the pivoted nozzle arrangement which is a major feature of my invention. The mechanism can be operated at unusually high speed and there are no complicated parts for reciprocating the nozzle up and down as has been characteristic of previous mechanisms. In fact, I have found in practice that the machine is easily capable of greasing upwards of 80 pans a minute and that this high speed operation can be continued over a very long period of time without trouble of any kind.

I claim:

1. In pan greasing apparatus where the pans are moved past the grease delivery point, the combination of a grease delivery nozzle of a length sufficient to project into the pans and mounted in a position which, normally, is directly in the path of movement of a pan side, said mounting including a pivot upon which the nozzle can swing to clear the pan side and then return to its normal position where it will project into the pans, means controlled by the position of the pan and adapted to swing the nozzle on its pivot to clear the pan side as aforesaid and then to permit its return to normal position where it will project into the pan, means for delivering grease to and discharging it from said nozzle, valve means normally closing the nozzle outlet, a motor means for opening said valve means to permit grease discharge, and tripping means for activating said motor means, said tripping means being controlled by the position of the pan and constructed and arranged to effect actuation of said motor means only when the nozzle projects into the pan.

2. In pan greasing apparatus where the pans are moved past the grease delivery point, the combination of a grease delivery nozzle of a length sufficient to project into the pans and mounted in a position which, normally, is directly in the path of movement of a pan side, said mounting including a pivot upon which the nozzle can swing to clear the pan side and then return to its normal position where it will project into the pans, means controlled by the position of the pan and adapted to swing the nozzle on its pivot to clear the pan side as aforesaid and then to permit its return to normal position where it will project into the pan, conduit means for delivering grease to said nozzle, yieldable valve means normally closing the nozzle outlet, a motor device constructed and arranged to place the grease in the delivery conduit means under pressure which is sufficient to open the nozzle closing means and cause discharge of grease from the nozzle outlet, and tripping means for activating said motor means, said tripping means being controlled by the position of the pan and constructed and arranged to effect actuation of said motor means only when the nozzle projects into the pan.

3. In pan greasing apparatus, where the pans are moved past the grease delivery point, the combination of a grease delivery nozzle adapted to project into the pan and mounted in a position which, normally, is directly in the path of movement of a pan side, a yieldable valve normally closing the nozzle outlet, said mounting including a pivot pin on which the nozzle can swing to clear the pan side and then return to its normal position where it will project into the pan, conduit means for conveying the grease to said nozzle, said conduit means including grease cylinder and piston means, a motor device having a reciprocating member adapted to strike said piston, said reciprocating member being normally retracted to provide a gap between itself and the piston, and means for suddenly moving said reciprocating member to close said gap and deliver a hammer-like blow on the piston, whereby to place the grease in the delivery conduit means under pressure which is sufficient to open the nozzle closing valve and cause discharge of grease from the nozzle outlet, and tripping means actuated by movement of the pan and adapted to effect actuation of said motor device as described.

4. In pan greasing apparatus the combination of a grease nozzle having means for substantially lateral discharge of grease, conduit means for delivering grease to said nozzle, a yieldable valve normally closing the nozzle outlet, grease cylinder means in communication with said conduit means, grease piston means in said cylinder means, and a motor device having a reciprocating member adapted to strike said grease piston means, said reciprocating member being normally retracted to provide a gap between itself and the grease piston means, and means for suddenly moving said reciprocating member to close said gap and deliver a hammer-like blow on the grease piston means, whereby to place the grease in the delivery conduit means under pressure which is sufficient to open the nozzle closing valve and cause said substantially lateral discharge of grease from the nozzle outlet.

5. Pan greasing apparatus according to claim 4 wherein two serially arranged grease cylinders and two grease pistons are employed, one of which cylinders with its piston being of smaller diameter than the other, the larger piston being the one which receives the direct impact of the reciprocating member and the smaller cylinder being the one which is in communication with said conduit means, together with a hydraulic operating connection between the larger and the smaller pistons.

6. Pan greasing apparatus according to claim 4 wherein the reciprocating member of the motor device is an air pressure actuated piston controlled by means which is tripped by the pan to effect delivery of the actuating air pressure.

7. Pan greasing apparatus according to claim 5, wherein the reciprocating member of the motor device is an air pressure actuated piston controlled by means which is tripped by the pan to effect delivery of the actuating air pressure.

8. In pan greasing apparatus where the pans are moved past the grease delivery point, the combination of a grease nozzle adapted to deliver substantially laterally into the pan, conduit means for conveying the grease to said nozzle, cooperating grease cylinder and piston members one of which members is movable with relation to the other, said cylinder being in communication with said conduit for conveying the grease to the nozzle, a motor device having a reciprocating member adapted to strike the movable member of the cooperating grease cylinder and piston members, said reciprocating member being normally retracted to provide a gap between itself and said movable member, and tripping means adapted to be actuated by the pan to effect operation of said motor device whereby the reciprocating member is actuated to suddenly close said gap and deliver a hammer-like blow on said movable member, the operation being such as to place the grease in the grease conveying conduit under pressure which is sufficient to effect said substantially lateral discharge of grease from the nozzle when the pan is in position to receive the grease.

9. Pan greasing apparatus comprising in combination, a grease nozzle having substantially lateral grease discharging means; conduit means for delivering grease to the nozzle; a valve normally preventing discharge of grease; grease cylinder means in communication with said grease conduit means; a grease piston in the cylinder; and a motor device including a reciprocating member and a hydraulic chamber; said chamber being in communication with said grease cylinder means on the opposite side of the grease piston; said motor device being adapted to open the valve which normally prevents discharge of grease and said reciprocating member being adapted to simultaneously actuate the grease piston through the intermediation of said hydraulic chamber and said reciprocating member further being normally retracted from the position where it effects actuation of the grease piston to provide an intervening gap; and means for suddenly moving the reciprocating member to close said gap and deliver a hammer-like blow thru the hydraulic chamber to said grease piston, whereby to force the grease in the delivery conduit means out thru the nozzle and distribute it substantially laterally as aforesaid against the sides of a pan.

References Cited in the file of this patent

UNITED STATES PATENTS

| | | |
|---|---|---|
| 720,594 | Macarthy | Feb. 17, 1903 |
| 1,162,717 | White | Nov. 30, 1915 |
| 1,746,530 | Hatch | Feb. 11, 1930 |
| 1,989,880 | Peffer | Feb. 5, 1935 |
| 2,218,811 | Chaussabel | Oct. 22, 1940 |
| 2,267,491 | Burkhart | Dec. 23, 1941 |
| 2,499,621 | Archer | Mar. 7, 1950 |
| 2,544,007 | Cook | Mar. 6, 1951 |
| 2,701,542 | Tench | Feb. 8, 1955 |